July 4, 1967 K. MALAKOWSKI ETAL 3,328,889
NAVIGATIONAL DEVICES Filed April 19, 1965 9 Sheets-Sheet 1

Inventors
KAZIMERZ MALAKOWSKI
JOSEF WALCZAK
By Nolte & Nolte
Attorneys

July 4, 1967  K. MALAKOWSKI ETAL  3,328,889
NAVIGATIONAL DEVICES
Filed April 19, 1965  9 Sheets-Sheet 5

Inventors
KAZIMERZ MALAKOWSKI
JOSEF WALCZAK
By Nolte & Nolte
Attorneys

Fig. 13.

United States Patent Office 3,328,889
Patented July 4, 1967

3,328,889
NAVIGATIONAL DEVICES
Kazimerz Malakowski, 94 Eastcote Ave., Greenford, England, and Josef Walczak, 159 Wellington Road, Enfield, England
Filed Apr. 19, 1965, Ser. No. 449,096
Claims priority, application Great Britain, Apr. 29, 1964, 17,858/64
16 Claims. (Cl. 33—141.5)

The present invention relates to navigational devices for moving a map or other navigational display sheet across a field of view.

It is an object of the invention to provide a device which moves the map or other display sheet in dependence of the movement of a motor vehicle, which may be a motor car, a boat, or an airplane.

It is another object of the invention to provide such a device in which the direction of movement of the map or the like is manually or automatically settable in dependence on the direction in which the motor vehicle travels, so that the map indicates, at any time, the position of the motor vehicle.

Other objects and advantages of the invention will become clean from the following detailed description of the invention when read in conjunction with the appended drawings, which are given by way of example and in which.

Figure 1:
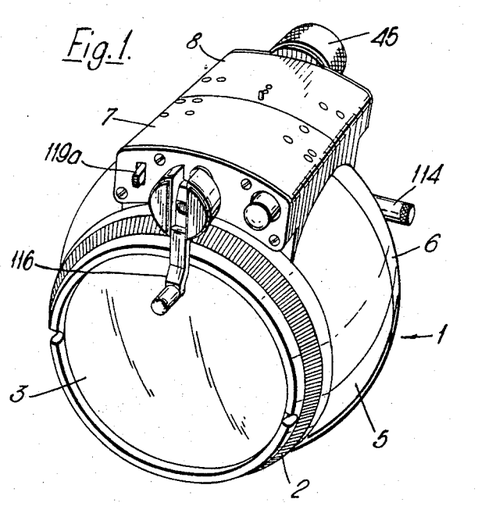
FIG. 1 shows a perspective view of a navigational device.

The navigational device shown in FIG. 1 has a housing 1 of moulded synthetic plastics material, and a rotatably adjustable ring member 2 also of moulded synthetic plastics material, the ring member 2 holding a glass lens 3. The housing 1 comprises two generally segmental spherically-shaped housing parts 5 and 6 and two further housing parts 7 and 8 respectively secured to the housing parts 5 and 6, the housing parts 5 and 7 forming one housing portion, the housing parts 6 and 8 forming another housing portion, and these two housing portions being secured together by catches 10 and 11 (see FIG. 2).

Figure 2:
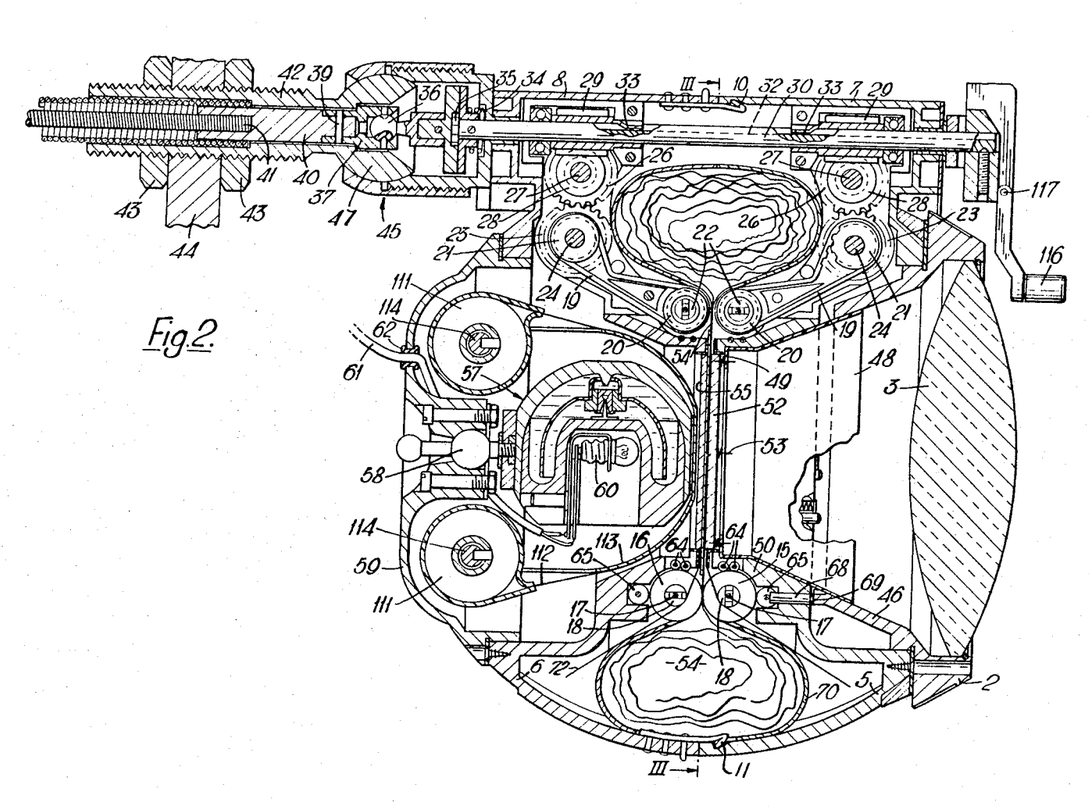
FIG. 2 shows a side view of the navigational device of FIG. 1 taken in section.
Figure 3:
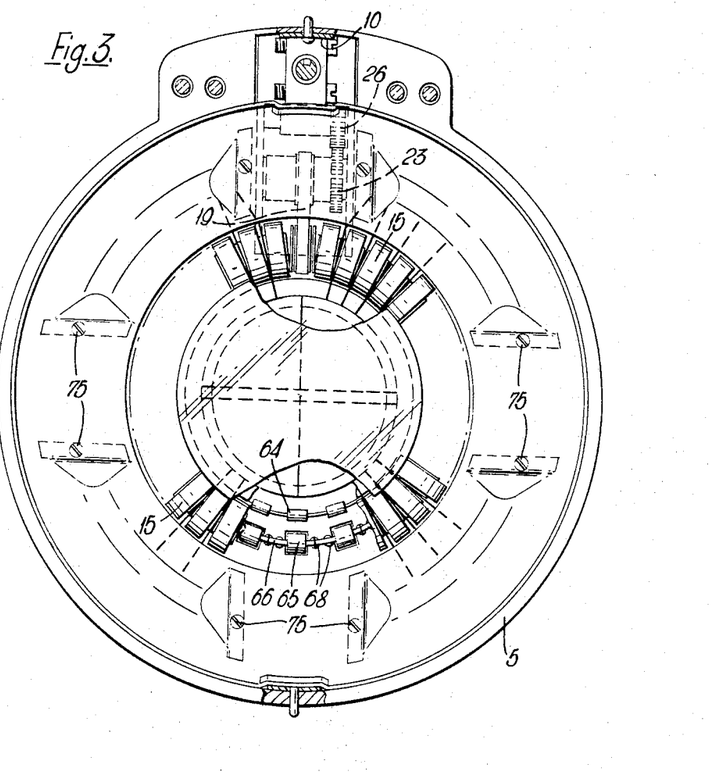
FIG. 3 shows a section through the navigational device taken along the line III—III of FIG. 2.
Figure 4:
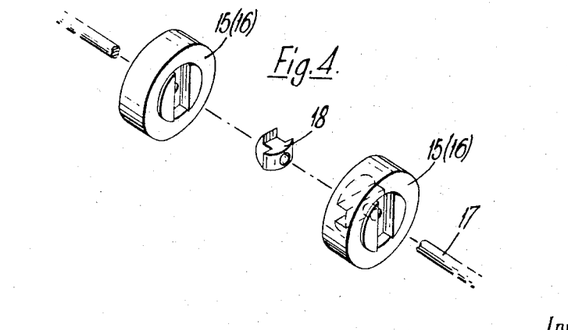
FIG. 4 shows in perspective a pair of adjacent friction drive rollers with a connecting dog therebetween, the friction drive rollers and the drive dog being separated for clarity.

As shown in FIG. 3, a circular set of frictional drive members in the form of frictional drive rollers 15 is mounted in the housing part 5. The rollers 15 co-operate with a counter-support formed by a similar circular set of rollers 16 mounted in the housing part 6 (see FIG. 2). Each of these two sets of rollers comprises a flexible support ring 17 carrying the rollers, and drive dogs 18 (see also FIG. 4) interposed between and inter-engaged within each adjacent pair of rollers to form a flexible drive connection therebetween. The sets of rollers are driven by flexible drive belts 19 (see FIG. 2) extending around pulleys 20, which are mounted on the support rings 17 and provided with dogs 22 engaging in the rollers 15 and 16 adjacent the pulleys 20, and pulleys 21 mounted for rotation with gears 23 on shafts 24 rotatably mounted within the housing parts 7 and 8. The gears 23 mesh with gears 26 which are mounted for rotation on shafts 27 with worm wheels 28, which in turn mesh with worms 29 carried on a power transmission shaft 30.

The power transmission shaft 30 is longitudinally slidable relative to the housing 1 and the worms 29, and is formed with a longitudinal slot 32, the worms 29 being restrained from longitudinal movement and provided with keys 33 slidably received in the slot 32 so that the worms 29 rotate with the power transmission shaft 30.

The shaft 30 is urged towards the left, as viewed in FIG. 2, by a compression spring 34 and is connected by a clutch 35, which has dogs interengageable under the action of the spring 34, to the ball 36 of a universal power-transmitting joint which includes a socket 37. This socket 37 is secured by a transverse pin 39 to a short, cylindrical connector 40 which is crimped to a flexible shaft 41. The connector 40 is rotatable within a sleeve 42, which is fixedly secured by lock nuts 43 to a part 44 of a motor car or other vehicle. The sleeve 42 is formed at one end with a ball 47 which is universally pivotable in a socket 45 secured to the housing part 8 to allow universal pivotal adjustment of the position of the housing 1 within the vehicle.

The ring member 2 holding the lens 3 is formed with a rearwardly-extending frusto-conical portion 46 to which is secured a frusto-conically shaped member 48 having an inturned flange 49 and guided by a correspondingly-shaped rearwardly extending portion 50 of the housing part 5. A transparent disc 52 of synthetic plastic material is urged to the left, as viewed in FIG. 2, by compression spring 53 interposed between the disc 52 and the inturned flange 49. A transparent map 54 extends between the transparent disc 52 and a further transparent disc 55 which is fixedly mounted in the housing part 6.

An illuminated compass 57 is disposed behind the transparent disc 55 and is universally pivotally supported by a universal pivot support 58 in a rear housing part 59 secured to the housing part 6. The compass 57 includes a bulb 60 connected to a conductor 61 extending through a grommet 62 in the housing part 59.

The rollers 15 and 16 are supported on circular sets of rollers 64 and 65 (FIGS. 2 and 3). The rollers 65 are carried on flexible rings 66. A plurality of pins 68 are longitudinally slidable within the housing portion 50 and an actuating member in the form of a cam 69 formed on the frusto-conical portion 46 of the ring member 2 urges some of the pins against the flexible shaft 66 to urge corresponding ones of the rollers 15 against the map 54 countersupported by the rollers 16.

Figure 5:
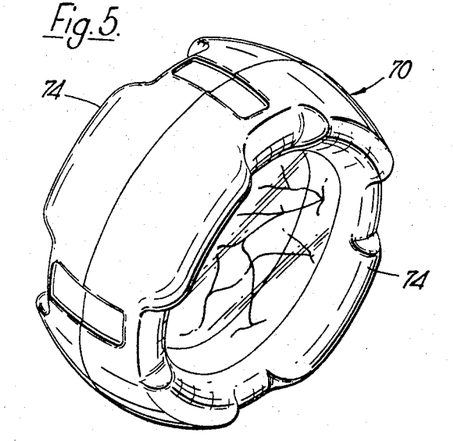
FIG. 5 shows a perspective view of a map cassette.

The edge portions of the map 54 are accommodated in a cassette 70. Two sets of wires 71 and 72 extend radially outwardly from the transparent discs 52 and 55 on opposite sides of the map 54 and pass between the rollers 15 and 16 and the cassette 70. These wires 71 and 72 serve to prevent the map 54 from being caught up between the rollers 15 and 16 and the cassette 70. The shape of the cassette 70 will be seen from FIG. 5, whence it will be observed that this cassette is formed in two halves with shaped projecting portions 74 on opposite sides thereof. These portions 74 are shaped to fit into corresponding recesses formed in the housing parts 5 and 6 for holding the cassette relative to these housing parts. As shown in FIG. 3, the cassette may be secured to the housing part 5 by screws 75. However, the screws 75 may be omitted if so desired, in which case the two halves of the cassette 70 are preferably joined together so that the cassette 70 containing the map 54 can be removed as a whole from the housing 1.

Figures 6, 7:
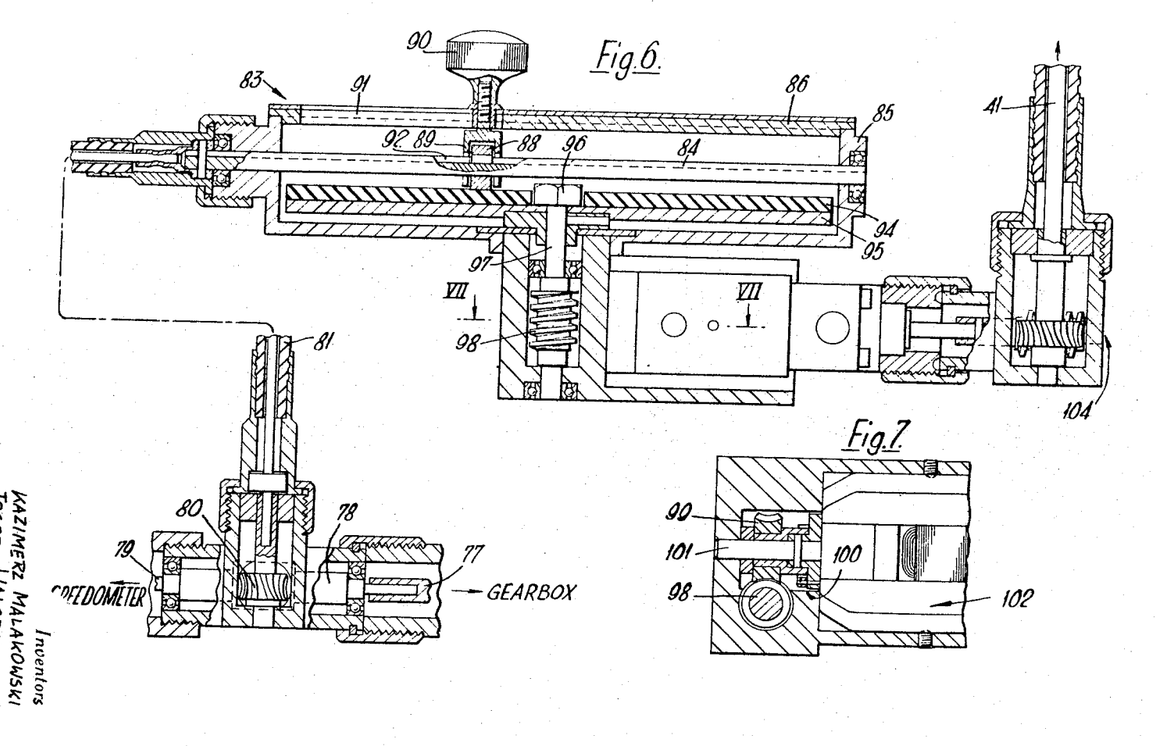
FIG. 6 shows a diagrammatic view taken in section through a power transmission means for the navigational device.
FIG. 7 shows a view of a part of the power transmission means taken in section along the line VII—VII of FIG. 6.

The navigational device is driven from the speedometer drive for the vehicle, which in turn is driven from the vehicle gear box. As shown in FIG. 6, a shaft 77 driven by the gear box is connected to a worm 78, which is in turn connected to a shaft 79 extending to the speedometer. A worm wheel 80 meshing with the worm 78 is connected to a flexible shaft 81 for driving a steplessly variable transmission indicated generally by reference numeral 83. For this purpose, the flexible shaft 81 is connected to a rigid shaft 84 which is rotatably mounted in a housing 85 having a cover 86. The shaft 84 serves as an input shaft and carries a roller 88, which is slidable along the shaft 84 by means of a fork member 89. The fork member 89 is connected to an actuating knob 90 slidable along a slot 91 in the housing cover 86 to adjust the roller 88 longitudinally of the shaft 84. The roller 88 has a portion slidably engaging in a slot 92 in the shaft 84 so that the rotation of the shaft 84 is imparted to the roller 88. The periphery of the roller 88 is in frictional power transmitting contact with the face of a rubber disc 94 secured to a metal disc 95. The disc 95 is secured by a nut 96 to an output shaft 97 carrying a worm 98. The worm 98 meshes with a worm wheel 99 (FIG. 7) which is connected through a one-way ratchet coupling 100 to drive the shaft 101 of an electric motor 102. The shaft 101 is connected at its other end through a reduction gearing 104 (FIG. 6) to the flexible shaft 41.

The purpose of the steplessly variable transmission 83 is to allow adjustment of the transmission ratio of the power transmission means extending between the worm wheel 80 and the rollers 15 and 16 in accordance with the scale of the map 54. This is effected by adjusting the drive roller 88 radially of the disc 94 by means of the actuating knob 90.

The purpose of the electric motor is to allow fast rotation of the rollers 15 and 16 for setting-up purposes. For energizing the electric motor, a push button 106 (FIGS. 1 and 8) is slidably mounted in the housing part 7 and is formed with a V-shaped slot 107 into which project the cam-shaped ends of two pivotably mounted switch contacts 108. The switch contacts 108 are normally held apart by the resilience of a rubber annulus 109 mounted therebetween, and can be closed by pushing the button 106 to compress the rubber annulus 109. The contacts 108 are in electrical contact with contact pins 111a projecting from the housing part 7 into sockets 112a in the housing part 8. The sockets 112a are connected by conductors (not shown) to the electric motor 102 so that this motor is energized by pressing the push button 106.

Referring again to FIG. 2, a display mechanism comprises a pair of spools 111 rotatably mounted in the housing part 59, and index strip 112 being wound on the spools 111 and extending between the spools 111 over a guide member 113 and behind the transparent disc 55. The index strip 112 may for example be of transparent material printed with display matter such as a street index. These spools 111 are mounted on spindles 114 which project from the housing part 59 (see FIGS. 1 and 8) to allow manual adjustment of the index strip 112 by winding the strip 112 from one of these spools 111 onto the other.

The operation of the device is as follows: For setting up the device the map 54 is inserted in the cassette 70 in the housing 1 and the push button 106 is pressed to energize the electric motor 102. The drive from the electric motor 102 is transmitted through the power transmission means to the rollers 15 and 16, but owing to the one-way ratchet coupling 100 is not transmitted back through the flexible shaft 81 to the gear box. The friction rollers 15 and 16 all rotate simultaneously and make light frictional contact with the map 54 so as to stretch the map in the field of view between the transparent discs 52 and 55. To bring the required portion of the map into this field of view, the ring member 2 is rotated so that some of the rollers 15 are displaced by the cam 69 towards the countersupport rollers 16. The map 54 is then driven by the frictional drive of the displaced rollers 15 and the corresponding counter-support rollers 16 across the field of view in a direction corresponding to the position of rotation of the ring member 2 and the cam 69.

When the map 54 is in an approximately correct position showing the environment of the vehicle on which the navigational device is mounted, the push button 106 is released and fine adjustment of the map 54 is effected by moving the power transmission shaft 30 to the right, as viewed in FIG. 2, and rotating it by means of a hand crank 116, the longitudinal movement of the shaft 30 serving to disengage the clutch 35. When the adjustment of the map 54 has been completed, the hand crank 116 is pivoted in an anticlockwise direction around a pivot pin 117. The drive shaft 30 is then released to slide longitudinally under the action of the compression spring 34 to the left, as viewed in FIG. 2, to re-engage the clutch 35.

The actuating knob 90 (FIG. 6) is then adjusted according to the scale of the map 54, and to facilitate this adjustment scale markings corresponding to map scales may be provided on the top of the cover 86. The navigational device is now ready for use.

On movement of the vehicle, the drive from the gear box is transmitted through the power transmission means to the rollers 15 and 16, which move the map 54 across the field of view in a direction determined by the position of rotational adjustment of the ring member 2 and at a speed proportional to the speed of travel of the vehicle. The ring member 2 is manually rotated in order to maintain a direction indicator in the form of a hair line on the disc 52 in alignment with a corresponding indicator on the compass. The ring member 2 is thus rotated each time the vehicle travels around a corner or bend, in order to alter the direction of travel of the map 54 across the field of view. The map, illuminated by the bulb 60, can be viewed through the lens 3 and, provided that the ring member 2 is corectly rotated, will at any instant show a map portion corresponding to the environment of the vehicle. Intersecting hair lines on the disc 52 indicate the position of the vehicle on the map.

The map 54 is of synthetic plastics material which will allow the map to be bunched up within the cassette 70 without cracking or splitting. The edge of the map may be provided with a lip or flange which will not pass between the rollers 15 and 16 so that the map cannot run out from between these rollers.

Figure 8:
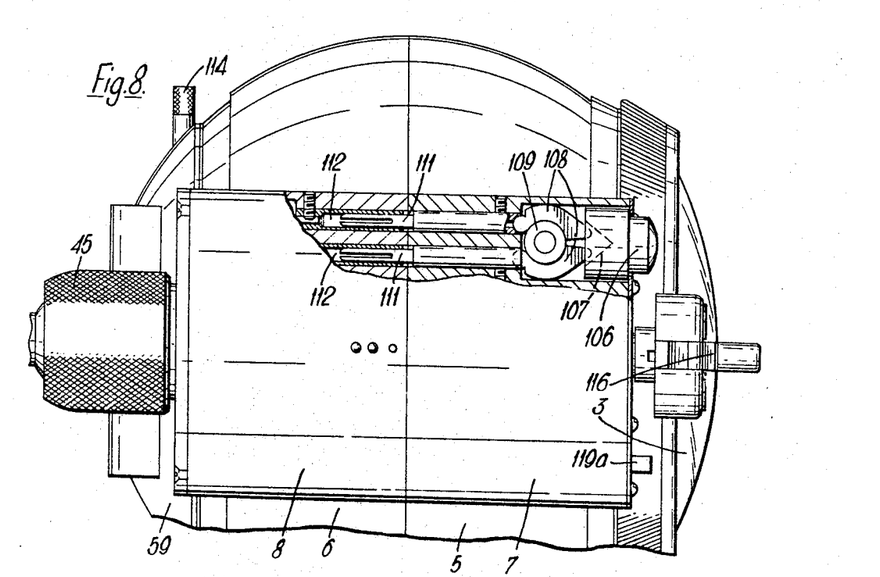
FIG. 8 shows a partial plan view of the navigational device.
Figure 9:
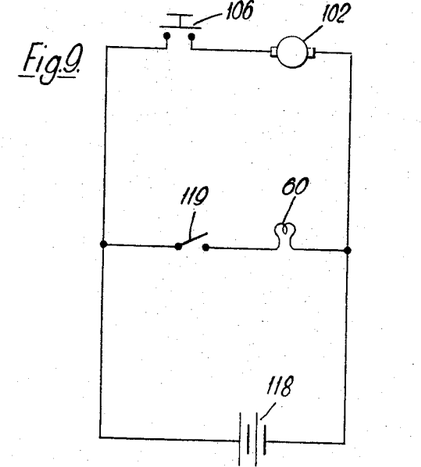
FIG. 9 is a circuit diagram of the electrical circuit of the navigational device.

FIG. 9 shows the circuit diagram of the electrical circuit of the above device. The electrical motor 102 for setting-up the map is connected in series with the push button switch 106 across a batery 118. The bulb 60 is likewise connected in series with a switch 119 across the battery 118, the switch 119 being provided in the housing part 7 and having an actuating arm 119a (see FIGS. 1 and 8).

FIGS. 10 to 14 show a compass-controlled device for automatically adjusting the ring member 2, in order to avoid the need for manual adjustment of the ring member 2 upon each change in the direction of travel of the vehicle in which the navigational device is mounted.

Figure 10:
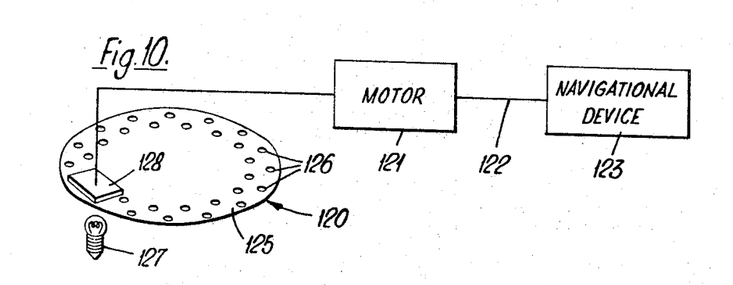
FIG. 10 shows a schematic illustration of a compass-controlled device for use in a modified form of the navigational device.

The compass-controlled device, as illustrated schematically in FIG. 10, comprises a compass generator indicated generally by reference numeral 120, which is connected to transmit control impulses to a motor 121. The output of the motor 121 is transmitted through a flexible drive 122 to a navigational device 123 which is similar to that described above but is modified as described below.

The compass 120, which is a modification of a conventional fluid-filled compass, has a north-seeking disc 125 formed with two sets of holes 126 which allow light to pass intermittently from a light bulb 127 through the disc 125 to a photocell assembly 128 on rotation of the disc 125.

Figure 11:
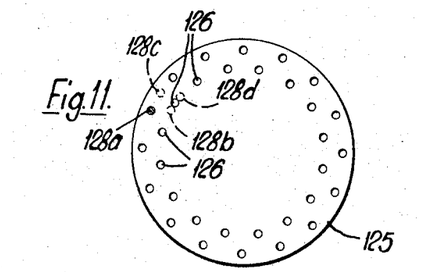
FIG. 11 shows a part of the compass of the device of FIG. 10.

As illustrated in FIG. 11, which shows an underenath view of the disc 125, the holes 126 are uniformly angularly spaced around the centre of the disc. The photocell assembly 128 comprises four photocells 128a, 128b, 128c and 128d which are disposed relative to one another and to the holes 126 so that on rotation of the disc 125 these photocells are sequentially illuminated one at a time by the light bulb 127. When the disc 125 is in the position shown in FIG. 11 relative to the photocell assembly, one of the holes 126 lies opposite the photocell 128a, which is therefore illuminated and has been shown shaded in FIG. 11. Electrical impulses emitted by the photocells 128a, 128b, 128c and 128d control the operation of the motor 121.

This motor has eight electro-magnets 130 (see FIGS. 12 and 13) mounted in a housing 131. The photocells 128a, 128b, 128c and 128d are connected to fast-acting relays 132a, 132b, 132c and 132d, each of which controls the energization of a pair of the electro-magnets 130 and to a time delay relay 133. An armature 134 is mounted on a shaft 135 journalled in the housing 131, the shaft 135 being connected to the flexible drive 122. Each of the electro-magnets 130 has a pole 137 extending through the wall of the housing 131, and an auxiliary armature 138 is provided with eight depending arms 139 of magnetic material, the auxiliary armature 138 being secured to the shaft 135 by a grub screw 140.

Figure 12:
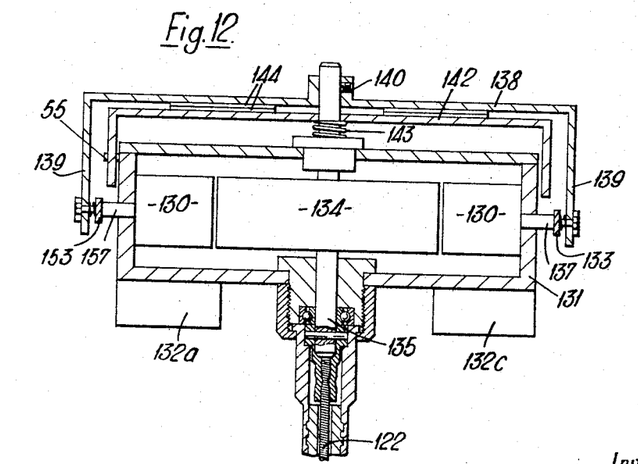
FIG. 12 shows a motor forming part of the device shown in FIG. 10.

Between the housing 131 and the auxiliary armature 138, a brake member 142 is slidably mounted on the shaft 135 and is urged towards the auxiliary armature 138 by a compression spring 143. Co-operating friction pads 144 are provided on adjacent faces of the auxiliary armature 138 and the brake member 142, and the brake member 142 is formed with eight depending arms 145 of magnetic material, which extend downwardly towards the poles 137 of the electro-magnets 130. The relays 132a, 132b, 132c and 132d are mounted on the undersurface of the housing 131.

Figure 14:
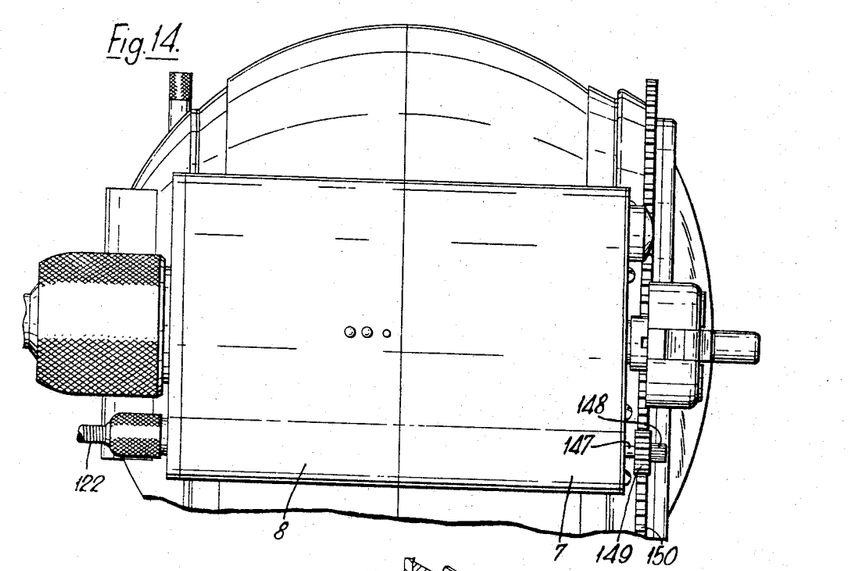
FIG. 14 is a partial plan view of the modified form of the navigational device.

As shown in FIG. 14, which is a view similar to FIG. 8 but which shows a modification of the navigational device, the flexible drive 122 is connected to a drive shaft 147, which is longitudinally slidably mounted in the housing parts 7 and 8. A knurled knob 148 is provided at one end of the shaft 147 for moving this shaft longitudinally to bring a gear wheel 149 on the shaft 147 into or out of engagement with a toothed ring 150 which is secured to the ring member 2. A click-stop device (not shown) is provided within the housing part 7 for locating the shaft 147 in two positions, in one of which the gear 149 meshes with the toothed ring 150 and in the other of which the gear 149 is out of engagement with the toothed ring 150 to allow manual adjustment of the ring member 2 for setting-up purposes.

Figure 13:
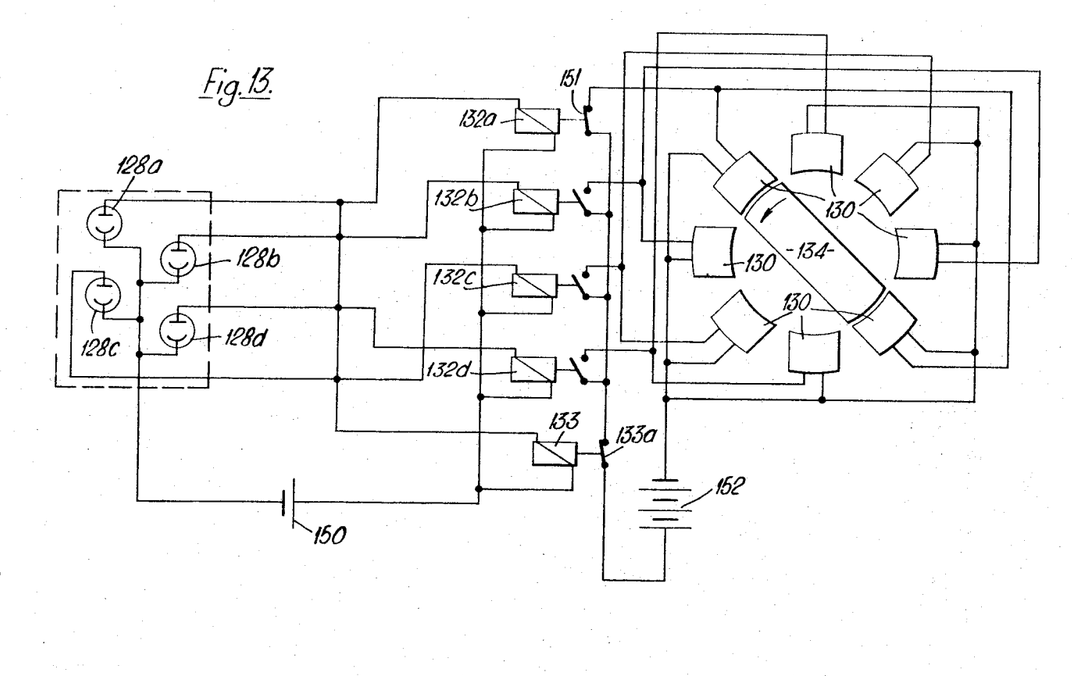
FIG. 13 is a circuit diagram showing the connection of the compass and the motor in the device illustrated in FIG. 10.

The operation of the above-described compass-controlled device is as follows:

When the vehicle on which the navigational device is mounted changes its direction of travel, the magnetic disc 125 rotates under the action of the earth's magnetic field thus allowing the electrical impulses to be transmitted by the photocell assembly to the relays 132a, 132b, 132c and 132d and to the relay 133, which closes its associated switch 133a. As shown in FIGS. 11 and 13, the disc 125 is in a position such that the photocell 128a is illuminated by the light bulb 127. The illumination of this photocell 128a effects energization of the corresponding relay 132a from a source of electrical current 150. Energization of the relay 132a in turn effects closure of a switch 151 to connect the corresponding pair of electro-magnets in parallel to a battery 152. The armature 134 is accordingly attracted into alignment with this pair of electro-magnets 130, two of the depending arms 139 of the auxiliary armature 138 simultaneously being attracted to the poles 137 of these two electro-magnets. The purpose of this auxiliary armature is to ensure that the armature 134 rotates directly into alignment with the energized electro-magnets 130 without hunting, and for this purpose shoes 153 carried by the depending arms 139 and spring-biased towards the housing 131 make sliding contact with the poles 137 of the energized electro-magnets 130, the shoes 153 being of magnetic material so as to be attracted by these poles.

The depending arms 145 of the brake member 142 are likewise attracted by the poles 137 of the two energized electro-magnets 130, so that the brake member 142 is moved downwardly, as viewed in FIG. 12, against the action of the compression spring 143 to allow free rotation of the auxiliary armature 138. As the photocells 128a, 128b, 128c and 128d are successively illuminated on rotation of the magnetic disc 125, opposite pairs of the electro-magnets 130 are successively energized so that the armature 134 rotates in an anticlockwise direction, as viewed in FIG. 13. After a predetermined time delay, the relay 133 opens the switch 133a to de-energize the motor 121 and the brake member 142 is again urged by the spring 143 against the auxiliary armature 138 and, by means of the friction pads 144, exerts a frictional braking action thereon in order to prevent rotation of the shaft 134. The brake member 142 is prevented from rotating relative to the housing 131 by projections 155 (of which only one is shown in FIG. 12) projecting from the housing 131 and slidably engaging one of the depending arms 145 of the brake member 142.

Thus, on rotation of the magnetic disc 125, the electrical impulses emitted by the photocell assembly 128 cause a corresponding rotation of the armature 134 of the motor 121, which is transmitted by the flexible drive 122 to the drive shaft 147 and, through the gear 149, to the toothed ring 150 and the ring member 2. The latter is therefore rotated in accordance with the rotation of the magnetic disc 125 relative to the photocell assembly 128 to effect alteration of the direction of frictional driving of the map 54 across the field of view.

While two circular sets of holes 126 and a pair of photocells co-operating with each set have been shown in FIG. 11, the number and positions of holes and photocells employed to produce the electrical impulses may be other than as shown in FIG. 11.

Figure 15:
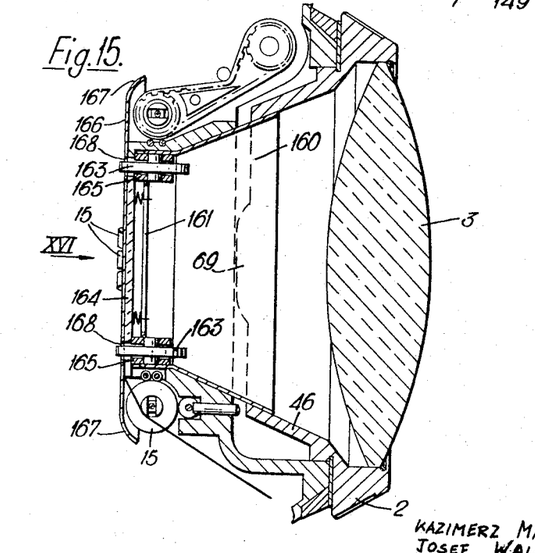
FIG. 15 is a view taken in elevation through parts of a further modification of the navigational device.
Figure 16:
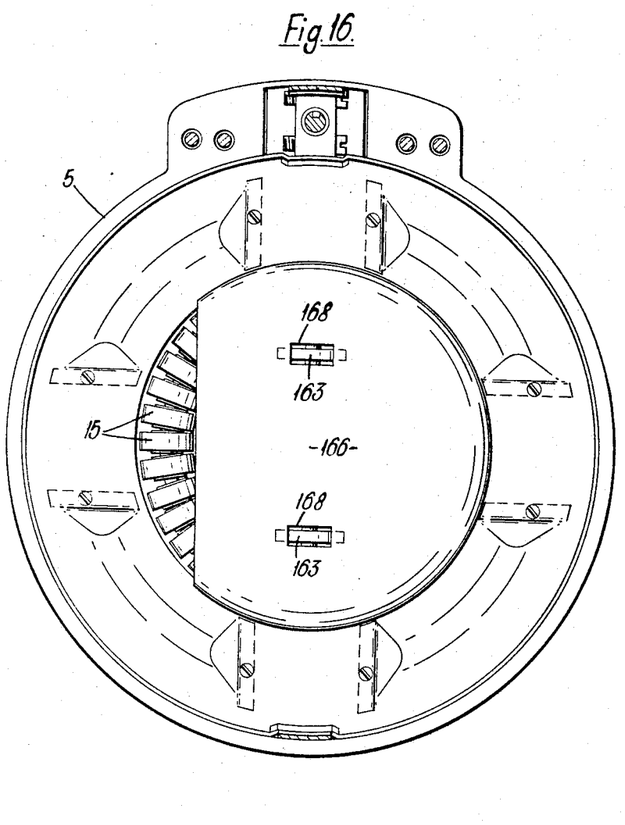
FIG. 16 is a view taken in elevation in the direction of the arrow XVI of FIG. 15.

In order to improve the feeding of the map by the frictional drive rollers 15 and 16, the navigational device may be modified as illustrated in FIGS. 15 and 16.

In this modification, the funnel-shaped member 48 described above with reference to FIG. 2 is replaced by a similar funnel-shaped member 160 secured to the frusto-conical portion 46 of the ring member 2 and having an inturned flange 161 similar to the flange 49. At opposite sides of the funnel-shaped member 160 the inturned flange 161 is cut away to allow resilient rollers 163 to project into contact with the map 54. The transparent disc 52 of FIG. 2 is similarly replaced by a transparent disc 164 which is also cut away to accommodate the rollers 163. The rollers 163 are freely rotatably mounted on brackets 165 secured to the inner wall surface of the funnel-shaped member 160 so that the axes of rotation of the rollers 163 extend transversely of the direction of travel of the map 54, which is determined by the position of the cam 69 on the frusto-conically shaped portion 46, and the purpose of the rollers 163 is to prevent "crabbing," i.e. movement of the map 54 transversely of this direction.

A shield plate 166 of transparent plastics material is secured to the transparent disc 164 by adhesive. The plate 166 has a flat central portion extending over the field of view and a curved edge portion, indicated by reference numeral 167, which extends partly over the outer periphery of the set of rollers 15. A pair of slots 168 are formed in the plate 166 to allow the rollers 163 to project therethrough into contact with the map 54 and, as shown in FIG. 16, a portion of the plate 166 is cut away to allow the rollers 15 displaced by the cam 69 to come into contact with the map, the remaining rollers 15 being shielded from the map 54 by the plate 166.

The modification shown in FIGS. 15 and 16 may of course be included in the modification of the navigational device described above with reference to FIGS. 10 to 14.

Further modifications of the above navigational devices are possible. For example, it is possible to employ only one set of rollers, the counter-support rollers 16 being replaced for example by an annular counter-support member of a transparent counter-support disc extending over the field of view.

In the embodiment illustrated, both sets of rollers are driven simultaneously at the same peripheral speed. However, it is possible to drive only the frictional drive rollers 15 and to mount the counter-support rollers freely rotatably. It is also possible for the drive rollers to be non-displaceable and for the counter-support rollers to be displaceable one or more at a time towards the drive rollers for effecting the driving of the map.

The variable power transmission shown in FIG. 6 may be modified by providing a worm extending radially across the top of the housing 85 for adjusting the fork member 89.

Instead of the compass-controlled device described above, the ring member may be linked to a steering wheel so as to be rotatably adjusted in dependence on the operation of the steering wheel.

It should be clearly understood that the embodiments described and illustrated are given by way of example. Many modifications, omissions and additions are possible without departing from the spirit of the invention.

We claim:

1. A navigational device for exhibiting a navigational display sheet, the device comprising two circular sets of rollers, said sets of rollers being arranged adjacent each other in parallel planes with said circular sets concentric to each other and of substantially equal inner and outer diameters, means for selectively urging at least one roller of one set towards an opposite roller of the other set to cause said one roller and said opposite roller to bear against opposite sides of said navigational display sheet, and means for rotating the rollers of at least one of said sets in dependence on the rate of movement of a motor vehicle for frictionally displacing the display sheet in dependence on said rate of movement and in a direction determined by the selection of said one roller and said opposite roller.

2. A navigational device for exhibiting a display sheet, the device comprising a plurality of frictional drive rollers, each of said drive rollers being rotatable about its axis, the roller axes lying substantially in a first common plane and being directed in different directions, counter-support means disposed in a second plane substantially parallel to said first common plane and arranged to support said display sheet between said counter-support means and said drive rollers, direction control means for selectively reducing the relative distance between at least one of said drive rollers and said counter-support means so as to cause said one roller and said counter-support means to bear against opposite sides of the display sheet, and drive transmission means for driving said drive rollers in dependence on the rate of movement of a motor vehicle for frictionally displacing the display sheet in dependence on said rate of movement and in a direction determined by said direction control means.

3. A device as defined in claim 2, wherein said direction control means comprise an actuating member adjustable by movement across said drive rollers.

4. A device as defined in claim 3, and comprising a direction indicator secured for movement with said actuating member, and a compass indicator, said actuating member being movably adjustable to bring said direction indicator into alignment with said compass indicator.

5. A device as defined in claim 3, wherein said actuating member comprises a cam mounted for rotation around said plurality of drive rollers.

6. A device as defined in claim 5, and comprising a plurality of pins, and spring means, said pins being longitudinally displaceable against the bias of said spring means by said cam for effecting displacement of said drive rollers.

7. A device as defined in claim 4, wherein said direction indicator comprises a transparent plate provided with a marking.

8. A device as defined in claim 2, wherein said counter-support means comprise a plurality of counter-support rollers, each of said counter-support rollers being rotatable about its axis, the counter-support roller axes lying substantially in a second common plane and being directed in different directions corresponding to the different directions of the axes of said drive rollers, said second common plane being substantially parallel to said first common plane with each pair of an axis of a counter-support roller and of an axis of a drive roller lying in a plane substantially perpendicular to said first and second common planes.

9. A device as defined in claim 8, wherein said drive transmission means are arranged for additionally driving said counter-support rollers.

10. A device as defined in claim 9, and further comprising a first flexible ring carrying said drive rollers, and a second flexible ring carrying said counter-support rollers.

11. A device as defined in claim 9, and further comprising a plurality of dogs, said dogs being interposed between adjacent drive rollers and between adjacent counter-support rollers and forming flexible connections between said adjacent rollers.

12. A device as defined in claim 2, wherein said drive transmission means comprise a steplessly variable transmission.

13. A device as defined in claim 12, wherein said steplessly variable transmission comprises a disc, a transmission roller, an output shaft and an input shaft extending radially across said disc connected to said output shaft, said transmission roller being carried on said input shaft and slidable longitudinally of said input shaft, said transmission roller being rotatable with said input shaft with the periphery of said transmission roller in contact with said disc.

14. A device as defined in claim 2, and further comprising compass-controlled means arranged for automatically operating said direction control means.

15. A device as defined in claim 2, and further comprising a rotatable shield, said shield being mounted to extend between said first common plane and said display sheet, a portion of said shield being cut away, means, included in said direction control means, for rotating said shield to a position where said bearing roller is exposed through said portion so as to allow said bearing roller to contact said display sheet through said portion.

16. A device as defined in claim 2, and comprising a pair of freely rotatable rollers arranged to bear against said navigational display sheet with their axes transverse to the direction of displacement of said navigational display sheet.

References Cited

UNITED STATES PATENTS

| | | | |
|---|---|---|---|
| 1,134,924 | 4/1915 | Snow | 33—129 |
| 2,089,003 | 8/1937 | Sack | 33—141.5 |
| 2,533,029 | 12/1950 | McNish | 33—141.5 |
| 2,649,781 | 8/1953 | Clewell | 33—141.5 |

LEONARD FORMAN, *Primary Examiner.*

J. M. FREED, *Assistant Examiner.*